US010133526B2

(12) United States Patent
RJ

(10) Patent No.: US 10,133,526 B2
(45) Date of Patent: Nov. 20, 2018

(54) IMAGE FORMING APPARATUS AND FIRMWARE UPDATING METHOD OF THE SAME

(71) Applicant: KYOCERA Document Solutions Inc., Osaka (JP)

(72) Inventor: Daniel Lee RJ, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/874,187

(22) Filed: Jan. 18, 2018

(65) Prior Publication Data

US 2018/0210680 A1    Jul. 26, 2018

(30) Foreign Application Priority Data

Jan. 20, 2017   (JP) .................................. 2017-008700

(51) Int. Cl.
G06F 3/12         (2006.01)

(52) U.S. Cl.
CPC ............ G06F 3/123 (2013.01); G06F 3/1236 (2013.01); G06F 3/1291 (2013.01)

(58) Field of Classification Search
CPC ....... G06F 3/123; G06F 3/1236; G06F 3/1291
USPC ....................................................... 358/1.15
See application file for complete search history.

(56) References Cited

U.S. PATENT DOCUMENTS

| | | | |
|---|---|---|---|
| 8,028,104 B2 * | 9/2011 | Meyer .................. | G06F 3/1203 710/46 |
| 2010/0149572 A1 * | 6/2010 | St. Jacques, Jr. .. | H04N 1/00244 358/1.13 |
| 2013/0335785 A1 * | 12/2013 | Qi ......................... | G06F 3/1222 358/3.28 |

FOREIGN PATENT DOCUMENTS

JP         2006-178751 A        7/2006

* cited by examiner

*Primary Examiner* — Neil R McLean
(74) *Attorney, Agent, or Firm* — Studebaker & Brackett PC

(57) ABSTRACT

An image forming apparatus includes a session determining section that determines to execute a multipoint session, a first request section that enquires about whether to participate in the multipoint session to other image forming apparatuses, a group forming section that forms a group that participates in the multipoint session including the image forming apparatus and the other image forming apparatuses that have sent a response to participate in the multipoint session when the response to participate in the multipoint session is received from the other image forming apparatuses, and a second request section that enquires about whether to execute the multipoint session to all of the other image forming apparatuses included in the group.

6 Claims, 17 Drawing Sheets

IMAGE FORMING APPARATUS AND FIRMWARE UPDATING METHOD OF THE SAME

INCORPORATION BY REFERENCE

The present application claims priority under 35 U.S.C. § 119 to Japanese Patent Application No. 2017-008700, filed on Jan. 20, 2017. The contents of this application are incorporated herein by reference in their entirety.

BACKGROUND

The present disclosure relates to an image forming apparatus and a firmware updating method of the same, particularly to a firmware updating technology.

In an image forming apparatus, firmware serves as a control program and is priorly stored in storage such as a hard disk drive (HDD). Also, in the image forming apparatus, a firmware updating job is performed according to a firmware version update that is released by a manufacturer of the image forming apparatus to do such things as improve functions of the image forming apparatus.

When an image forming apparatus is connected to a server of the manufacturer, the image forming apparatus receives new firmware from the server according to an operation by a person such as a worker and a firmware updating job is performed. When the image forming apparatus is not connected to the server, the image forming apparatus acquires the new firmware from a portable storage device such as USB memory that the person such as a worker connects to the image forming apparatus after storing the new firmware therein. Thus, the new firmware updating job is performed. Because of this, when a large number of image forming apparatuses are not connected to the server, large amounts of time and effort are required to update those image forming apparatuses with the new firmware.

An updating method for new firmware is known for an image forming apparatus that is not connected to a server. According to this method, effort for a person such as a worker can be reduced. An image forming apparatus that has been updated with the new firmware serves as a host device and advertises the new firmware to another image forming apparatus that is not connected to the server (another image forming apparatus that is connected to an intranet such as a company local area network (LAN) and serves as a client device). Then, the other image forming apparatus (client device) accesses the image forming apparatus (host device) using a peer-to-peer system and determines whether or not the new firmware is necessary. When it is determined that the new firmware is necessary, the other image forming apparatus (client device) receives the new firmware from the image forming apparatus (host device) and performs the new firmware updating job.

SUMMARY

An image forming apparatus according to an aspect of the present disclosure is assigned a predetermined multicast address, and includes storage, a communication section, a session determining section, a first request section, a group forming section, a second request section, and a transmission controller. The storage stores model information indicating a model of the image forming apparatus, firmware for use by the image forming apparatus, and version information indicating a version of the firmware. The communication section communicates with one or more other image forming apparatuses that are assigned the same multicast address. The session determining section determines to execute a multipoint session for sending new firmware through the communication section to the other image forming apparatuses using a peer-to-peer system when the new firmware and corresponding new version information are stored in the storage. The first request section sends a session ID identifying the multipoint session, the model information, and a first message to enquire about whether to participate in the multipoint session through the communication section to all of the other image forming apparatuses, when the session determining section has determined to execute the multipoint session through the communication section. The group forming section forms a group that participates in the multipoint session, including the image forming apparatus and one or more of the other image forming apparatuses that have the same model information as the model information and that have sent a response to participate in the multipoint session, when the communication section has received the response to participate in the multipoint session from the one or more other image forming apparatuses. The second request section sends the session ID, the version information, and a second message to enquire about whether to execute the multipoint session through the communication section to all of the other image forming apparatuses included in the group. The transmission controller executes the multipoint session through the communication section with one or more of the other image forming apparatuses that have version information differing from the version information and that have sent a response to execute the multipoint session, and sends the new firmware to the other image forming apparatuses having the differing version information through the communication section, when the communication section has received the response to execute the multipoint session from the other image forming apparatuses having the differing version information.

A firmware updating method according to another aspect of the present disclosure is for implementation on an image forming apparatus that is assigned a predetermined multicast address, and includes determining, primary sending, group forming, secondary sending, and tertiary sending. In the determining, it is determined to execute a multipoint session for sending new firmware through a communication section to one or more other image forming apparatuses that are assigned the same multicast address using a peer-to-peer system when the new firmware and corresponding new version information are stored in storage. In the primary sending, a session ID identifying the multipoint session, model information stored in the storage, and a first message to enquire about whether to participate in the multipoint session are sent through the communication section to all of the other image forming apparatuses. In the group forming, a group is formed that participates in the multipoint session, including the image forming apparatus and one or more of the other image forming apparatuses that have the same model information as the model information and that have sent a response to participate in the multipoint session, when the communication section has received the response to participate in the multipoint session from the one or more other image forming apparatuses. In the secondary sending, the session ID, the version information, and a second message to enquire about whether to execute the multipoint session are sent through the communication section to all of the other image forming apparatuses included in the group. In the tertiary sending, the multipoint session is executed through the communication section with one or more of the other image forming apparatuses that have version information differing from the version information and that have sent a response to execute the multipoint session, and the new firmware is sent to the other image forming apparatuses having the differing version information through the communication section, when the communication section has received the response to execute the multipoint session from the other image forming apparatuses having the differing version information.

DETAILED DESCRIPTION

Figure 1:
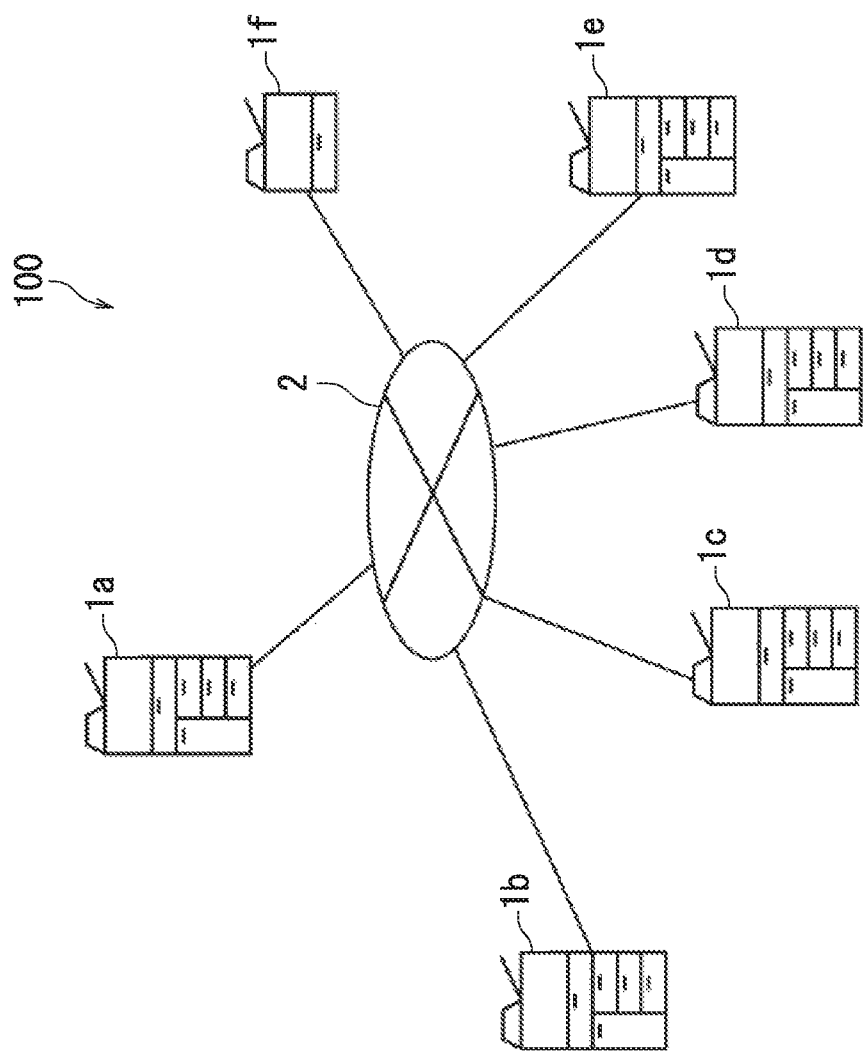
FIG. 1 is a diagram illustrating the entirety of an image forming system including an image forming apparatus according to an embodiment of the present disclosure.
Figure 2:
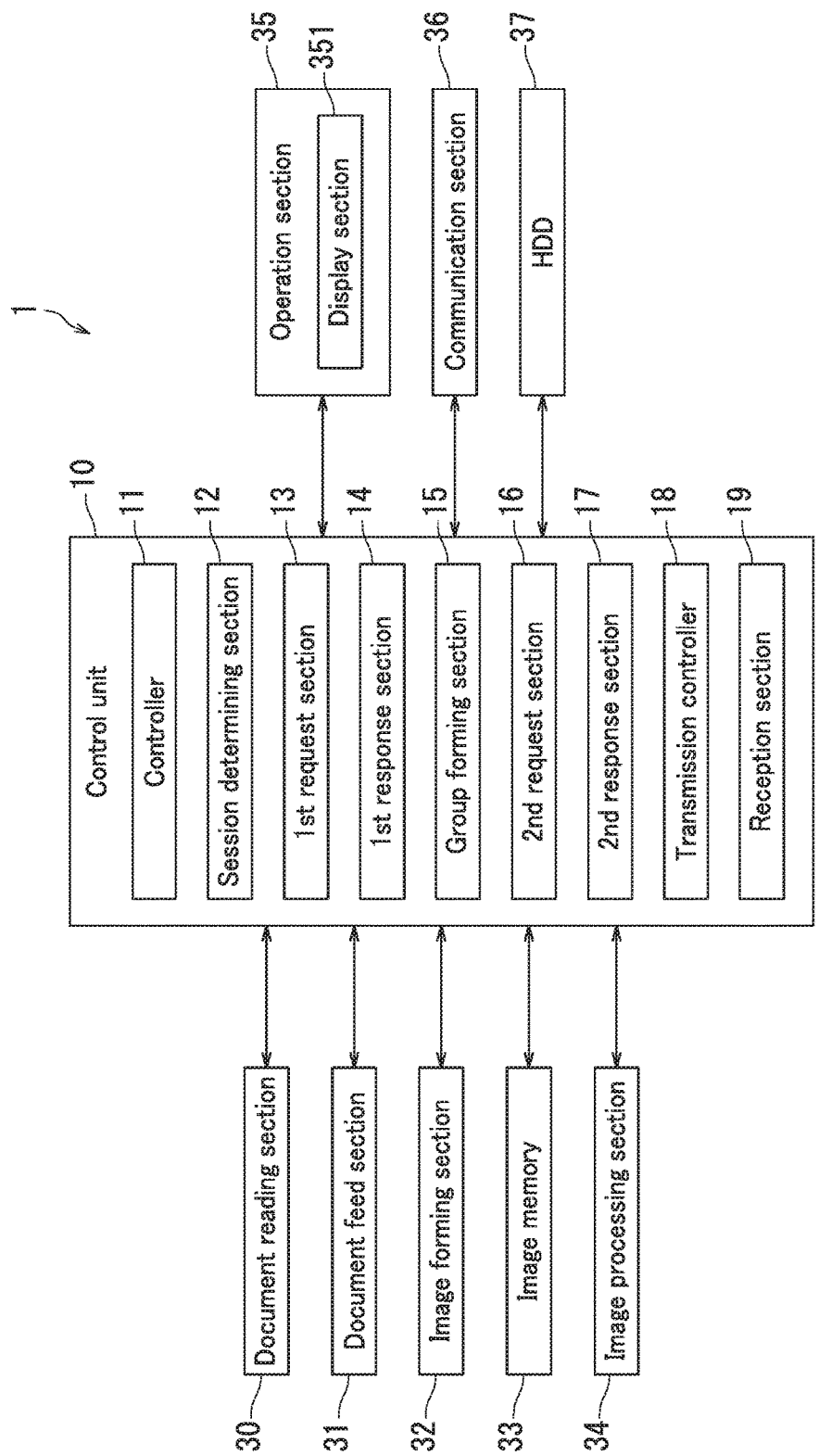
FIG. 2 is a function block diagram illustrating a main element configuration of the image forming apparatus.

An embodiment illustrating an image forming apparatus and a firmware updating method of the same according to the present disclosure will be described as follows with reference to the drawings. FIG. 1 is a diagram illustrating the entirety of an image forming system including the image forming apparatus according to the embodiment of the present disclosure. FIG. 2 is a function block diagram illustrating a main element configuration of the image forming apparatus.

An image forming system 100 includes a plurality of image forming apparatuses, for example six (generically referred to below as image forming apparatuses 1): 1a, 1b, 1c, 1d, 1e, and 1f. The image forming apparatuses 1 are connected to each other so as to be able to send and receive data through an intranet 2. The intranet 2 is a company local area network (LAN), for example.

In the image forming system 100, each of the image forming apparatuses 1 is assigned identification information such as a unique IP address and grouping information for all of the image forming apparatuses 1 such as a single predetermined multicast address. Note that in the present embodiment, the image forming system 100 is not connected to an outside network.

Also, in the image forming system 100, USB memory or another device such as an information processing device is connected to one of the image forming apparatuses 1 by a user or an administrator. Thus, when the image forming apparatus 1 is updated with new firmware from the USB memory, the information processing device, or the other device, the image forming apparatus 1 functions as a host device image forming apparatus 1 that supplies the new firmware. Then, in the image forming system 100, when the other image forming apparatuses 1 receive the new firmware from the host device image forming apparatus 1 as client devices, the client device image forming apparatuses 1 perform a new firmware updating job (described later in detail). Then, the image forming apparatuses 1 that have performed the new firmware updating job as client devices subsequently send the new firmware to the other image forming apparatuses 1 as host devices. That is, each of the image forming apparatuses 1 of the image forming system 100 functions as both a host device and a client device.

The image forming apparatus 1, for example, is a multi-function peripheral that includes a plurality of functions such as a copy function, a print function, a scan function, and a facsimile function. The image forming apparatus 1 includes a control unit 10. The control unit 10 includes components such as a central processing unit (CPU), random access memory (RAM), read-only memory (ROM), and specialized hardware circuits, and governs overall operational control of the image forming apparatus 1.

The image forming apparatus 1 also includes a document reading section 30, a document feed section 31, an image forming section 32, image memory 33, an image processing section 34, an operation section 35, a communication section 36, and a hard disk drive (HDD) 37.

The operation section 35 receives instructions from the user concerning operations and processes that are executable by the image forming apparatus 1, such as an image forming operation execution instruction or a document reading operation execution instruction. The operation section 35 includes a display section 351 that displays operation guidance to the user, and the like. The display section 351 is equipped with a liquid-crystal display (LCD) or similar display technology that includes a touch panel function (not shown).

When the image forming apparatus 1 performs a document reading operation, the document reading section 30 optically reads objects such as images from a document forwarded by the document feed section 31 and generates image data.

When the image forming apparatus 1 performs an image forming operation (that is, a printing operation), a later-described controller of the control unit 10 causes the image forming section 32 to execute print processing based on the image data generated by the document reading operation on recording paper and form an image on the recording paper. The recording paper is a recording medium supplied from an unillustrated paper feed section.

The document reading section 30 is under the control of the control unit 10, and includes a reading mechanism with components such as a light irradiation section and a charge-coupled device (CCD) sensor (not illustrated). The document reading section 30 irradiates the document through the light irradiation section, reads the image from the document by receiving reflected light through the CCD sensor, and generates the image data.

The image memory 33 is an area in which document image data acquired by the document reading section 30 is temporarily stored and data for print processing is temporarily saved. The print processing is to be performed by the image forming section 32.

The image processing section 34 reads the image read by the document reading section 30 from the image memory 33 and performs image processing. For example, the image processing section 34 performs predetermined image processing such as shading correction to improve the image quality after an image has been formed by the image forming section 32 from the image read by the document reading section 30.

The image forming section 32 forms the image from the image data acquired through the document reading section 30.

Also, when the image forming section 32 performs printing in color, for example, image forming units of the image forming section 32 respectively form toner images on photosensitive drums through a process of charging, exposing, and developing based on an image made from different color components of the above printing data. The image forming units of the image forming section 32 include a magenta image forming unit, a cyan image forming unit, a yellow image forming unit, and a black image forming unit. The toner images are transferred to an intermediate transfer belt by a primary transfer roller (not shown).

The communication section 36 includes a communication module such as a LAN adapter and communicates with the other image forming apparatuses 1 that are assigned the same multicast address and are connected to the communication section 36 through the intranet 2.

The HDD 37 is a high-volume storage device that stores data such as the document image read by the document reading section 30. The HDD 37 also stores information that indicates a model of the image forming apparatus 1, firmware used by the image forming apparatus 1, and version information indicating a version of the firmware. Note that the HDD 37 functions as an example of "storage" according to an aspect of the present disclosure.

The control unit 10 includes components such as a CPU, ROM, and RAM, and controls overall operation of the image forming apparatus 1. The control unit 10 includes a controller 11, a session determining section 12, a first request section 13, a first response section 14, a group forming section 15, a second request section 16, a second response section 17, a transmission controller 18, and a reception section 19.

The control unit 10 includes components such as a processor, RAM, and ROM. The processor is a CPU, a microprocessor unit (MPU), or an application-specific integrated circuit (ASIC), for example. The control unit 10 functions as the controller 11, the session determining section 12, the first request section 13, the first response section 14, the group forming section 15, the second request section 16, the second response section 17, the transmission controller 18, and the reception section 19 through the execution of a firmware updating program by the processor stored on the HDD 37. Note that the controller 11, the session determining section 12, the first request section 13, the first response section 14, the group forming section 15, the second request section 16, the second response section 17, the transmission controller 18, and the reception section 19 may be respectively implemented by hardware circuitry and not by software operations based on the firmware updating program. As follows, the same applies to any other embodiments unless otherwise stated.

The controller 11 controls overall operation of the image forming apparatus 1. For example, the controller 11 is connected to components such as the document reading section 30, the document feed section 31, the image forming section 32, the image memory 33, the operation section 35, the communication section 36, and the HDD 37. The controller 11 drives and controls each of the above components.

The controller 11 also stores the new firmware and the new version information on the HDD 37 when the reception section 19 receives the new firmware from one of the other image forming apparatuses 1.

When an image forming apparatus 1 acquires the new firmware from the connected unillustrated information processing device and the new firmware and the corresponding new version information are stored on the HDD 37, the image forming apparatus 1 functions as a host device and the session determining section 12 thereof determines to execute a multipoint session for sending the new firmware through the communication section 36 to the other image forming apparatuses 1 that function as client devices using a peer-to-peer system.

When the session determining section 12 has determined to execute the multipoint session through the communication section 36, the first request section 13 sends an session ID that identifies the multipoint session, the model information, and a first message to enquire about whether to participate in the multipoint session through the communication section 36 to all of the client device image forming apparatuses 1.

When the communication section 36 of one of the client device image forming apparatuses 1 has received the session ID, the model information, and the first message from the host device image forming apparatus 1, the first response section 14 compares the received model information with the model information stored on the HDD 37. When it is determined that the received model information and the model information stored on the HDD 37 match, the first response section 14 sends a response to participate in the multipoint session as a response to the first message through the communication section 36 to the host device image forming apparatus 1. By contrast, when it is determined that the received model information and the model information stored on the HDD 37 do not match, the first response section 14 sends a response not to participate in the multipoint session as a response to the first message through the communication section 36 to the host device image forming apparatus 1.

When the communication section 36 of the host device image forming apparatus 1 has received a response to participate in the multipoint session from the client device image forming apparatuses 1 that have the same model information as the sent model information, the group forming section 15 forms a group that participates in the multipoint session, including the host device image forming apparatus 1 and the client device image forming apparatuses 1 that have sent responses to participate in the multipoint session. That is, when forming the group, the group forming section 15 stores the IP addresses of the image forming apparatuses 1 that are included in the group on the HDD 37.

Also, when forming the group that participates in the multipoint session, the group forming section 15 generates a list of the image forming apparatuses 1 included in the group (for example, a list of the IP addresses stored on the HDD 37) and sends the list through the communication section 36 to all of the client device image forming apparatuses 1 included in the group.

The second request section 16 sends the session ID, new firmware-related information including the new version information, and a second message to enquire about whether to execute the multipoint session through the communication section 36 to all of the client device image forming apparatuses 1 included in the group.

Note that the new firmware-related information may for example include the following concerning the new firmware: the corresponding new version information, a creation date, and an IP address of the source. Also note that in the following description, for the sake of simplicity, a case in which the version information is sent and received without the other firmware-related information will be described as an example.

When the communication section 36 of one of the client device image forming apparatuses 1 has received the list from the host device image forming apparatus 1, the second request section 16 of the host device image forming apparatus 1 sends the session ID, the new version information, and the second message through the communication section 36 to all of the client device image forming apparatuses 1 included in the group using the received list.

Also, when the controller 11 has stored the new firmware and the new version information on the HDD 37, the second request section 16 sends the new version information and the second message through the communication section 36 to all of the client device image forming apparatuses 1 included in the group.

When the communication section 36 of each of the client device image forming apparatuses included in the group has received the second message, the second request section 16 of the host device image forming apparatus 1 finishes sending the session ID, the version information, and the second message through the communication section 36 to all of the client device image forming apparatuses 1 included in the group.

When the communication section 36 of one of the client device image forming apparatuses 1 has received the session ID, the new version information, and the second message from the host device image forming apparatus 1, the second response section 17 compares the received new version information with the version information stored on the HDD 37. When the version information differs (for example, the received new version information is newer than the version information stored on the HDD 37), the second response section 17 sends a response to execute the multipoint session as a response to the second message through the communication section 36 to the host device image forming apparatus 1.

When the communication section 36 of the host device image forming apparatus 1 has received the responses to execute the multipoint session from the client device image forming apparatuses 1 that have version information which differs from the sent new version information, the transmission controller 18 executes the multipoint session through the communication section 36 with the client device image forming apparatuses 1 that have sent the responses to execute the multipoint session. Thus, the transmission controller 18 sends the new firmware to the client device image forming apparatuses 1 through the communication section 36.

When the second response section 17 of one of the client device image forming apparatuses 1 has sent the response to execute the multipoint session through the communication section 36 to the host device image forming apparatus 1, the reception section 19 executes the multipoint session with the host device image forming apparatus 1 through the communication section 36 and receives the new firmware from the host device image forming apparatus 1 through the communication section 36.

As later described in detail, when the image forming apparatus 1 functions as a host device, the controller 11, the session determining section 12, the first request section 13, the group forming section 15, the second request section 16, and the transmission controller 18 operate. When the image forming apparatus 1 functions as a client device, the controller 11, the first response section 14, the second response section 17, and the reception section 19 operate.

When the image forming apparatus 1 functions as a host device, the following firmware updating method is implemented. That is, the firmware updating method updates the firmware in the client device image forming apparatuses 1 that have been assigned the predetermined multicast address and includes determining. In the determining, when the new firmware and the corresponding new version information are stored in the HDD (storage) 37, it is determined to execute the multipoint session through the communication section 36. In the multipoint session, the new firmware is sent to the client device image forming apparatuses 1 that have been assigned the same multicast address as the above multicast address, using a peer-to-peer system.

The firmware updating method also includes primary sending. In the primary sending, the session ID identifying the multipoint session, the model information stored on the HDD 37, and the first message to enquire about whether to participate in the multipoint session are sent through the communication section 36 to all of the client device image forming apparatuses 1. The firmware updating method also includes group forming. In the group forming, when the communication section 36 has received the response to participate in the multipoint session from the client device image forming apparatuses 1 that have the same model information as the sent model information, the group is formed that participates in the multipoint session. The group includes the host device image forming apparatus 1 and the client device image forming apparatuses 1 that have sent the responses to participate in the multipoint session.

The firmware updating method also includes secondary sending. In the secondary sending, the session ID, the version information, and the second message to enquire about whether to execute the multipoint session is sent through the communication section 36 to all of the client image forming apparatuses 1 included in the group.

The firmware updating method also includes tertiary sending. In the tertiary sending, when the communication section 36 of the host device image forming apparatus 1 has received the responses to execute the multipoint session from the client device image forming apparatuses 1 with different version information from the sent version information, the multipoint session is executed through the communication section 36 with the client device image forming apparatuses 1 that have sent the responses to execute the multipoint session. In the multipoint session, the new firmware is sent (as described later in detail) to the client device image forming apparatuses 1 through the communication section 36.

Figure 3:
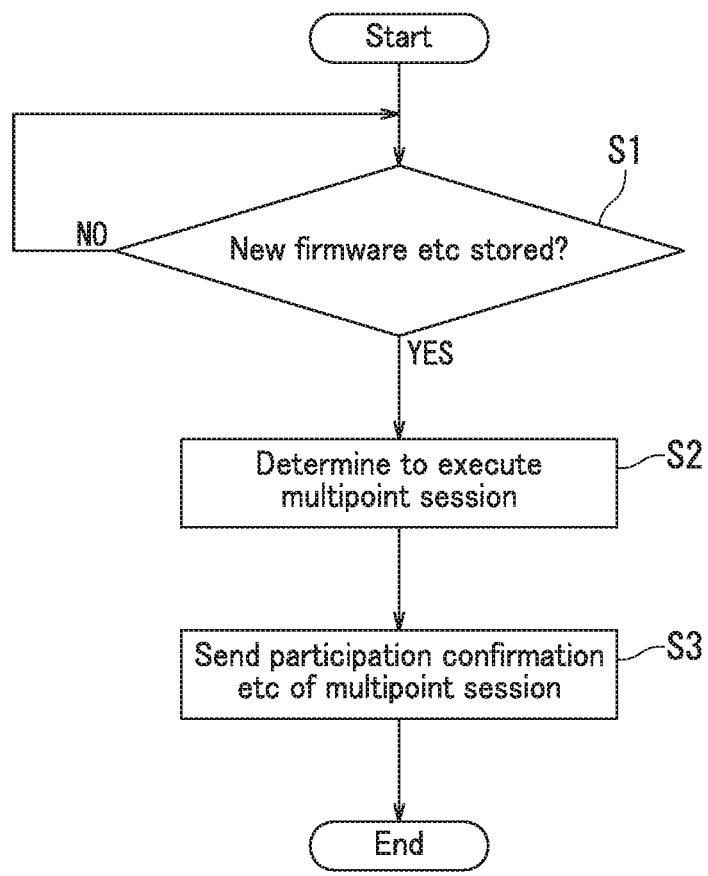
FIG. 3 is a flowchart illustrating a portion of a process of a host device image forming apparatus.
Figure 4:
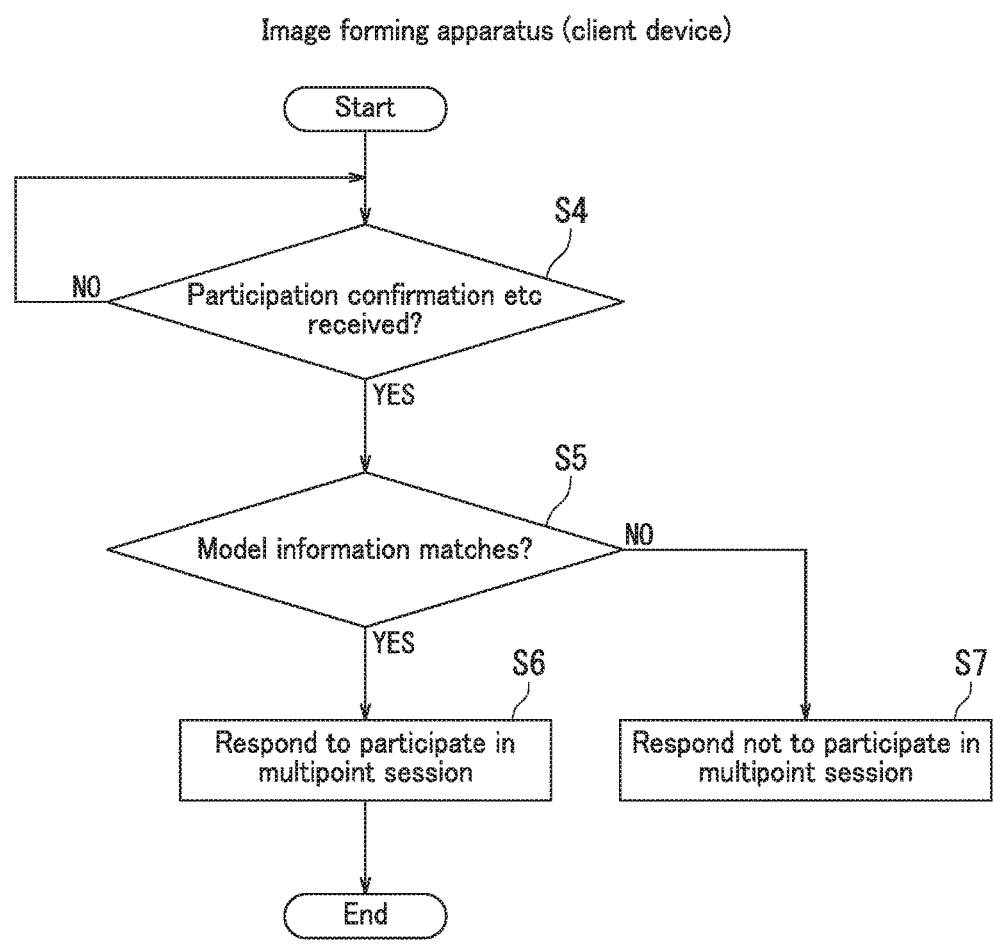
FIG. 4 is a flowchart illustrating a portion of a process of a client device image forming apparatus.
Figure 5:
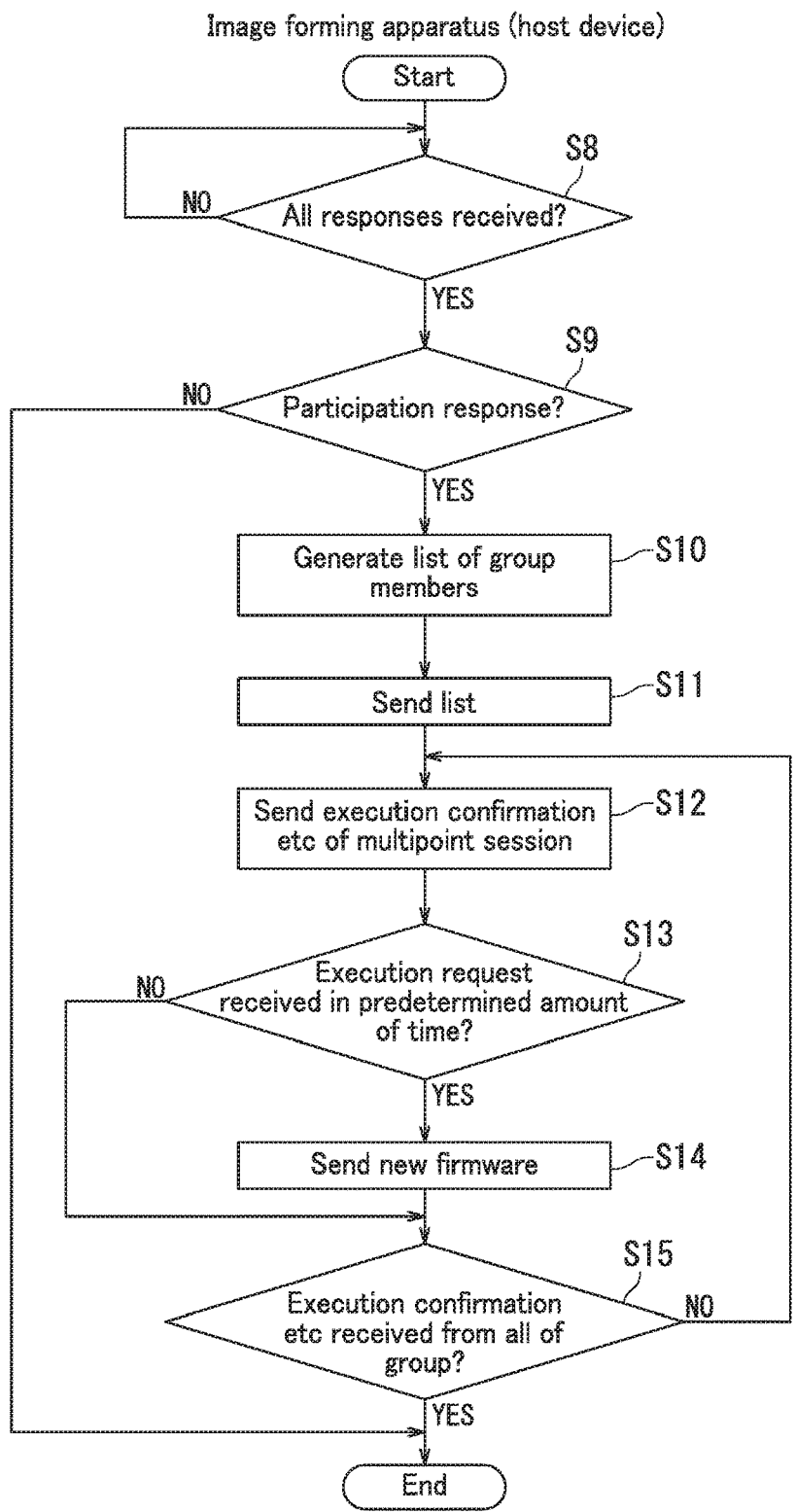
FIG. 5 is a flowchart illustrating a remaining portion of the process of the host device image forming apparatus.
Figure 6:
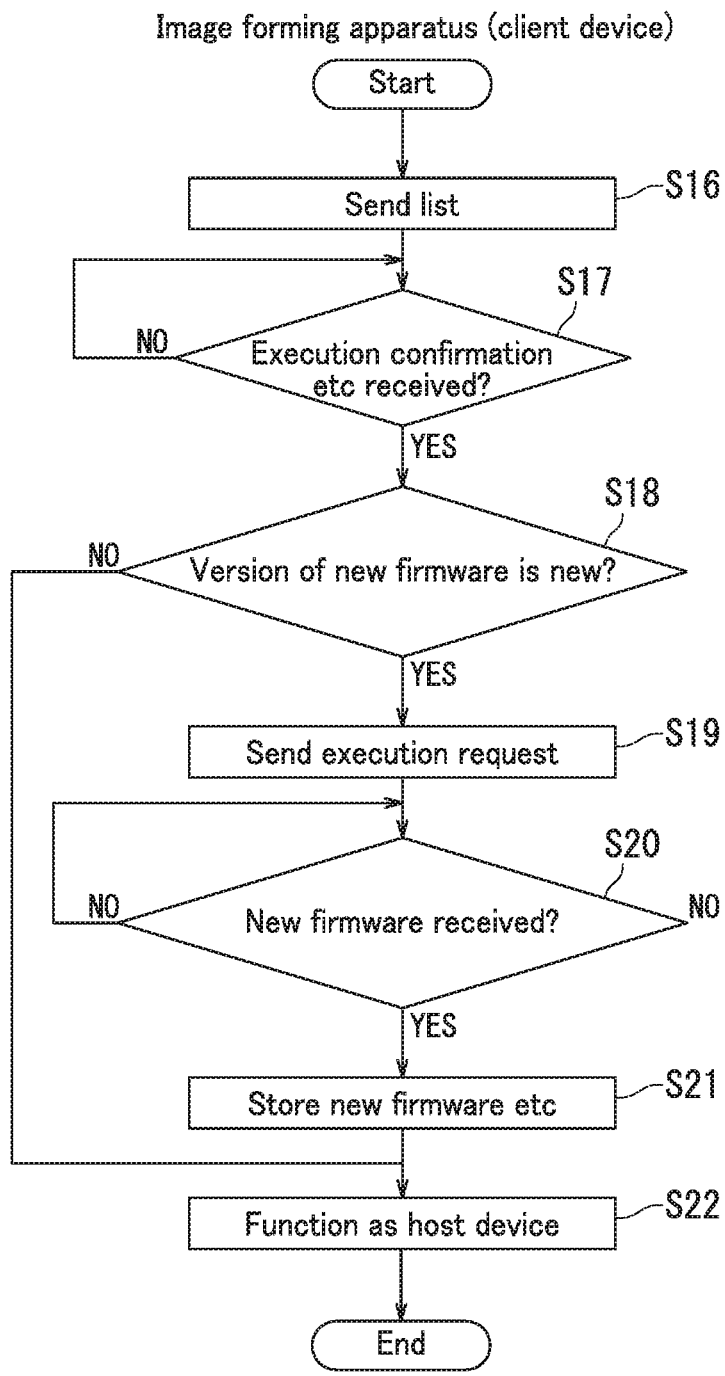
FIG. 6 is a flowchart illustrating a remaining portion of the process of the client device image forming apparatus.

Next, operation of the image forming system 100 according to the present embodiment will be specifically described. FIG. 3 is a flowchart illustrating a portion of a process of a host device image forming apparatus. FIG. 4 is a flowchart illustrating a portion of a process of a client image forming apparatus. FIG. 5 is a flow chart illustrating a remaining portion of the process of the host device image forming apparatus. FIG. 6 is a flowchart illustrating a remaining portion of the process of the client device image forming apparatus. Note that in the following description, a case in which an image forming apparatus 1a functions as the first host device will be described as an example. Furthermore, among six image forming apparatuses 1a to 1f, only the image forming apparatus 1f will be described as a different model that uses different firmware from the other image forming apparatuses 1a to 1e.

In the image forming apparatus 1a that serves as the host device, the controller 11 determines whether the new firmware and the corresponding new version information are stored in the image forming apparatus 1a, according to an operation by the user or the administrator through the operation section 35 (S1). For example, the controller 11 determines whether the new firmware and the new version information acquired from a storage medium by the controller 11 are stored on the HDD 37 according to the operation by the user or the administrator through the operation section 35, after the recording medium is connected to an unillustrated external terminal by the user or the administrator. The recording medium is a portable recording medium such as USB memory, and the new firmware and the new version information are priorly stored therein. When the controller 11 has determined that the new firmware and the new version information are not stored in the image forming apparatus 1a (NO in S1), the image forming apparatus 1a enters a standby state.

By contrast, when the controller 11 has determined that the new firmware and the new version information are stored on the HDD 37 (YES in S1), the session determining section 12 determines to execute the multipoint session through the communication section 36 (S2: determining). In the multipoint session, the new firmware is sent to all of the other image forming apparatuses 1b to 1f that are connected to the intranet 2 using a peer-to-peer system.

Next, the first request section 13 sends the session ID, the model information of the image forming apparatus 1a, and the first message to enquire about whether to participate in the multipoint session through the communication section 36 to all of the other image forming apparatuses 1b to 1f (S3: primary sending). That is, the host device image forming apparatus 1a sends information such as participation confirmation in the multipoint session to all of the client device image forming apparatuses 1b to 1f.

Figure 7:
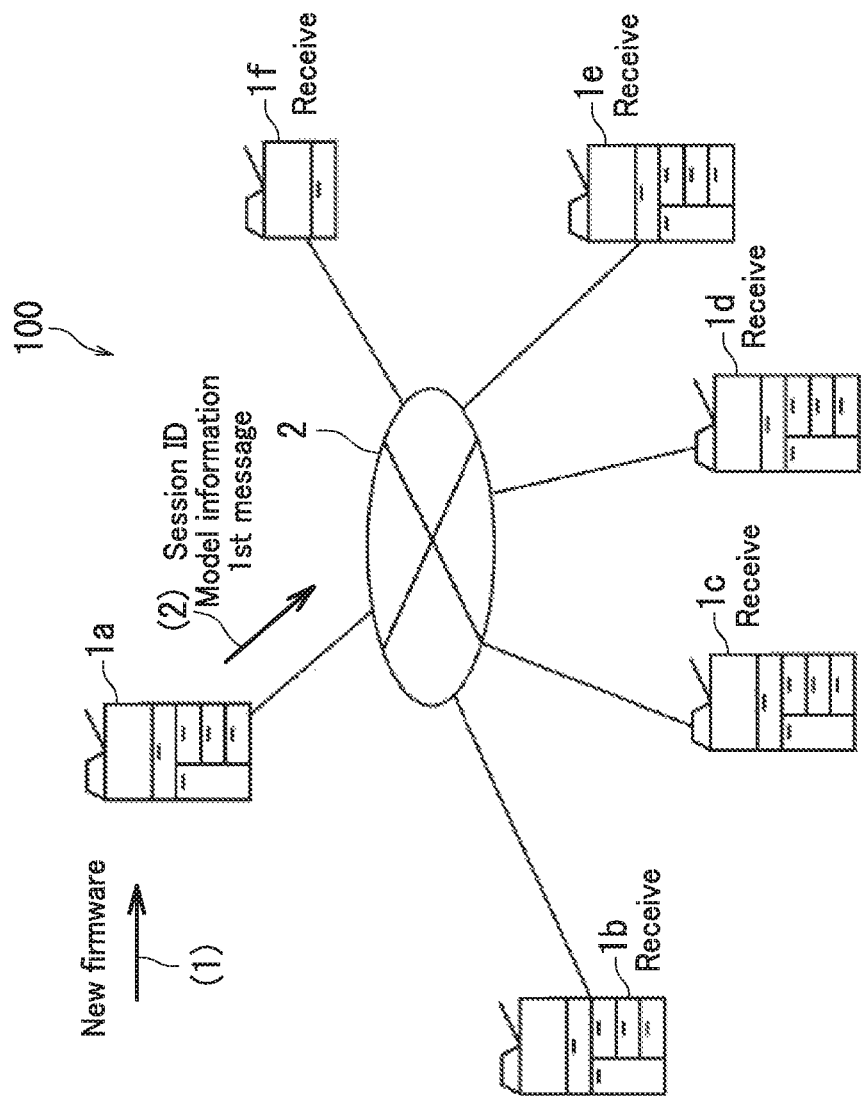
FIG. 7 is a diagram illustrating an operating state of a plurality of image forming apparatuses included in the image forming system when a first request section of the host device image forming apparatus has operated.

For example, when information such as the new firmware is acquired by the image forming apparatus 1a from an unillustrated recording medium or information processing device as indicated by an arrow (1) in FIG. 7, the image forming apparatus 1a sends the session ID, the model information, and the first message to all of the image forming apparatuses 1b to 1f that have been assigned the same multicast address, as indicated by an arrow (2) in FIG. 7. Then, the image forming apparatuses 1b to 1f receive the information such as the participation confirmation in the multipoint session from the image forming apparatus 1a.

In each of the client device image forming apparatuses 1b to 1f, the controller 11 determines whether the communication section 36 has received the information such as the participation confirmation (that is, the session ID, the model information, and the first message) from the image forming apparatus 1a (S4). When the controller 11 detects that the information such as the participation confirmation was not received (NO in S4), the corresponding image forming apparatus 1b, 1c, 1d, 1e, or 1f enters a standby state.

When the controller 11 detects that the information such as the participation confirmation was received (YES in S4), the first response section 14 compares the model information received from the image forming apparatus 1a with the model information stored on the HDD 37 and determines whether or not the model information matches (S5). When the first response section 14 determines that the model information matches (YES in S5), the first response section 14 sends a response to participate in the multipoint session through the communication section 36 to the image forming apparatus 1a, as a response to the first message (S6).

By contrast, when the first response section 14 determines that the model information does not match (NO in S5), the first response section 14 sends a response not to participate in the multipoint session through the communication section 36 to the image forming apparatus 1a, as a response to the first message.

That is, because the client device image forming apparatuses 1b to 1e are of the same model as the host device image forming apparatus 1a, the image forming apparatuses 1b to 1e each send a response to participate in the multipoint session to the image forming apparatus 1a. By contrast, because the client device image forming apparatus 1f is of a different model than the image forming apparatus 1a, the image forming apparatus 1f sends a response not to participate in the multipoint session to the image forming apparatus 1a.

In the host device image forming apparatus 1a, the controller 11 determines whether responses have been received by the communication section 36 from all of the client device image forming apparatuses 1b to 1f (S8). When the controller 11 does not detect that the communication section 36 has received responses from all of the client device image forming apparatuses 1b to 1f (NO in S8), the image forming apparatus 1a enters a standby state.

When the controller 11 detects that the communication section 36 has received responses from all of the client device image forming apparatuses 1b to 1f (YES in S8), the group forming section 15 determines whether the communication section 36 has received participation responses from all of the client device image forming apparatuses 1b to 1f (S9). When the group forming section 15 detects that the communication section 36 has not received participation responses from all of the client device image forming apparatuses 1b to 1f (NO in S9), the group forming section 15 determines that there are no image forming apparatuses to which information such as the new firmware is to be sent, and the process ends.

When the group forming section 15 detects that the communication section 36 has received a participation response from at least one of the client device image forming apparatuses (YES in S9), the group forming section 15 forms a multipoint session participation group that includes the host device image forming apparatus 1a and all of the client device image forming apparatuses 1b to 1e that have sent responses to participate in the multipoint session (group forming). The group forming section 15 then generates a list of the image forming apparatuses 1a to 1e that are included in the group (S10). Next, the group forming section 15 sends the generated list through the communication section 36 to all of the client device image forming apparatuses 1b to 1e included in the group (S11). The unique IP addresses respectively assigned to the image forming apparatus 1a to 1e that are included in the group are also recorded in the list.

Continuing, the second request section 16 uses the list to send the session ID, the new version information, and the second message to enquire whether to execute the multipoint session through the communication section 36 to all of the other image forming apparatuses 1b to 1e included in the group (S12: secondary sending). That is, the host device image forming apparatus 1a sends information such as execution confirmation of the multipoint session to all of the client device image forming apparatuses 1b to 1e included in the group.

Figure 8:
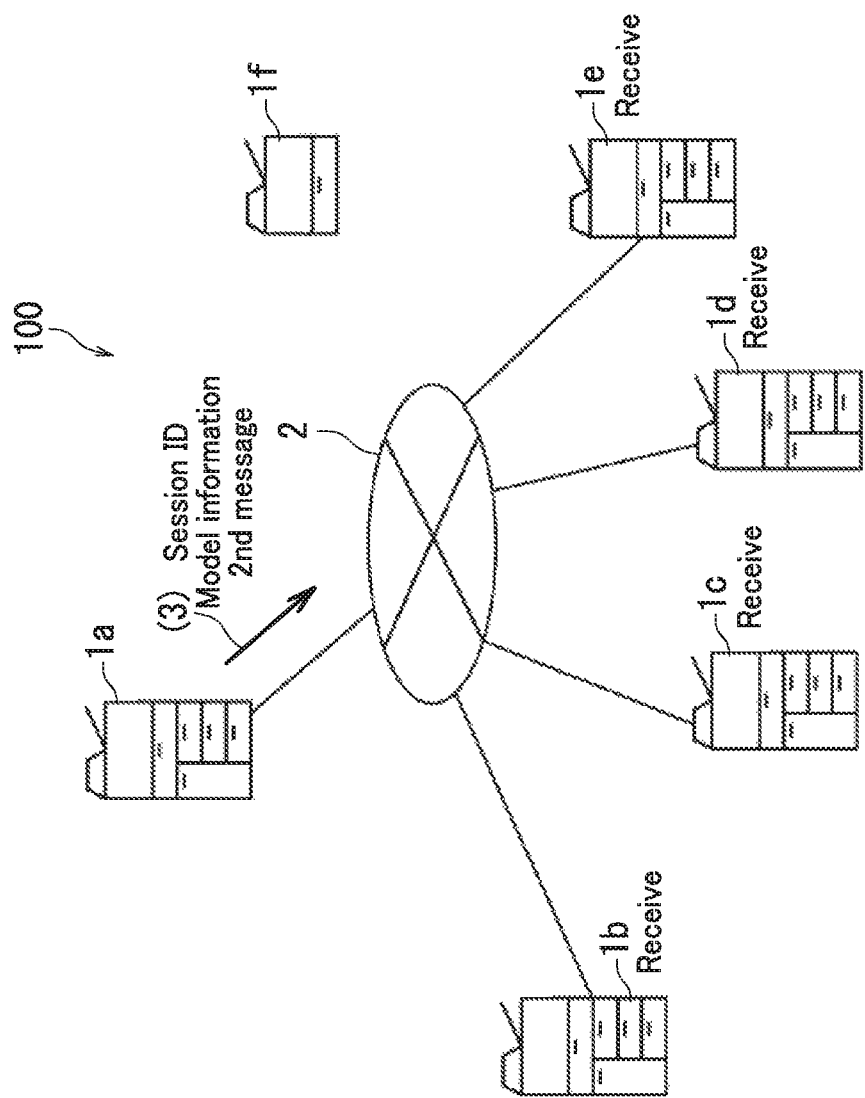
FIG. 8 is a diagram illustrating an example of the operating state of the image forming apparatuses included in the image forming system when a group forming section and a second request section of the host device image forming apparatus have operated.

For example, the image forming apparatus 1a sends the session ID, the new version information, and the second message to all of the image forming apparatuses 1b to 1e included in the group, as indicated by an arrow (3) in FIG. 8. Then, the client device image forming apparatuses 1b to 1e receive the information such as the execution confirmation of the multipoint session from the image forming apparatus 1a.

Continuing, the controller 11 determines whether the communication section 36 has received responses to execute the multipoint session from any of the client device image forming apparatuses 1b to 1e that are included in the group, within a predetermined amount of time from the moment the information such as the execution confirmation of the multipoint session was sent (S13). When the controller 11 has determined that the communication section 36 did not receive a response to execute the multipoint session within the predetermined amount of time (NO in S13), it is determined that the new version information was not different from the version information in all of the client device image forming apparatuses 1b to 1e included in the group, and the process progresses to a later described S15.

When the controller 11 detects that the communication section 36 has received the response to execute the multipoint session as a response to the second message from at least one of the client device image forming apparatuses 1b to 1e within the predetermined amount of time (YES in S13), the transmission controller 18 executes the multipoint session through the communication section 36 with the client device image forming apparatuses 1b, 1c, 1d, or 1e that has sent the response to execute the multipoint session, and sends the new firmware to the transmission source of the response through the communication section 36 (S14: tertiary sending step). The transmission source is the other image forming apparatus 1b, 1c, 1d, or 1e. The predetermined amount of time is from approximately one to five minutes, for example.

Continuing, the controller 11 determines whether the communication section 36 has received information such as the execution confirmation of the multipoint session from all of the image forming apparatuses 1b to 1e included in the group (S15). When the controller 11 detects that the communication section 36 has not received the information such as the execution confirmation of the multipoint session from all of the image forming apparatuses 1b to 1e included in the group (NO in S15), the process returns to S12. That is, the second request section 16 resends the information such as the execution confirmation of the multipoint session to the client device image forming apparatuses 1b to 1e using the list.

By contrast, when the controller 11 detects that the communication section 36 has received the information such as the execution confirmation of the multipoint session from all of the image forming apparatuses 1b to 1e included in the group (YES in S15), the controller 11 determines that the reception of the new firmware in all of the other image forming apparatuses 1b to 1e included in the group has finished, and the process ends.

In each of the client device image forming apparatuses 1b to 1e included in the group, the communication section 36 receives the list of the group from the host device image forming apparatus 1a (S16). Any of the client device image forming apparatuses 1b to 1e may function as a host device as later described in detail. In such a situation, the image forming apparatuses 1b, 1c, 1d, or 1e can select an appropriate destination for the new firmware, and can efficiently perform the new firmware updating job, because the image forming apparatuses 1b to 1e receive the list of the group as described above.

Continuing, the controller 11 of each of the image forming apparatuses 1b to 1f determines whether the communication section 36 has received the information such as the execution confirmation (that is, the session ID, the new version information, and the second message) from the image forming apparatus 1a (S17). When the controller 11 has determined that the information such as the execution confirmation was not received (NO in S17), the corresponding image forming apparatus 1b, 1c, 1d, 1e, or 1f enters a standby state.

By contrast, when the controller 11 has determined that the information such as the execution confirmation was received (YES in S17), the second response section 17 compares the received new version information with the version information stored on the HDD 37, and determines whether the new firmware is newer than the firmware stored in the HDD 37 (S18). When the second response section 17 has determined that the new firmware is the same as the firmware stored on the HDD 37, or that the new firmware is older than the firmware stored on the HDD 37 (NO in S18), the second response section 17 determines that a new firmware update is not necessary, disregards the second message from the host device image forming apparatus 1a, and does not respond to the second message. Then, the process progresses to a later described S22. Additionally or alternatively, when the second response section 17 has determined that the new firmware update is not necessary, the second response section 17 may send a message to indicate that the execution of the multipoint session is not necessary through the communication section 36 to the host device image forming apparatus 1a, as a response to the second message.

When the second response section 17 determines that the new firmware is newer than the firmware stored on the HDD 37 (YES in S18), the second response section 17 determines that the new firmware update is necessary and sends a response (execution request) to execute the multipoint session through the communication section 36 to the host device image forming apparatus 1a, as a response to the second message (S19).

Next, the controller 11 executes the multipoint session with the host device image forming apparatus 1a through the communication section 36 and determines whether the new firmware was received by the reception section 19 from the image forming apparatus 1a (S20). When the controller 11 has determined that the reception section 19 did not receive the new firmware (NO in S20), the corresponding image forming apparatus 1b, 1c, 1d, or 1e enters a standby state.

By contrast, when the controller 11 has determined that the reception section 19 did receive the new firmware (YES in S20), the controller 11 stores the new firmware and the corresponding new version information that was received in S18 on the HDD 37 (S21).

Figure 9:
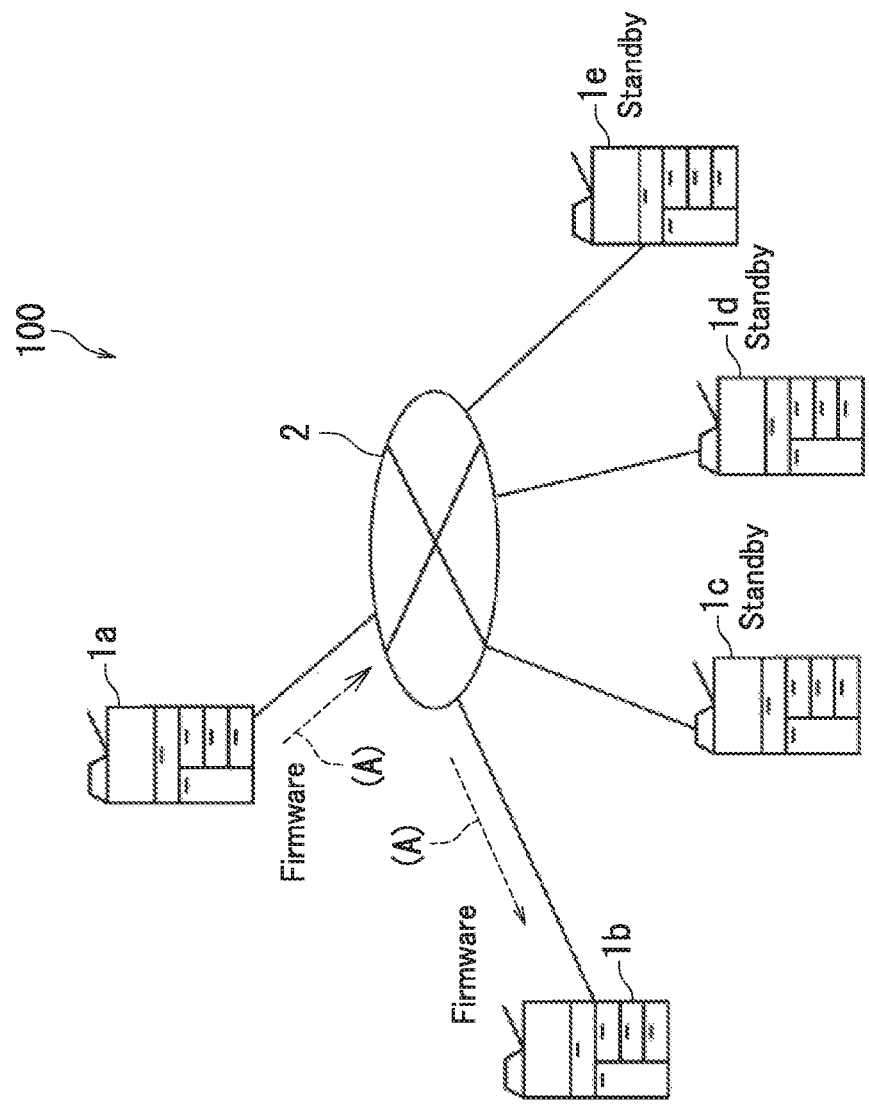
FIG. 9 is a diagram illustrating an example of sending and receiving new firmware between the host device image forming apparatus and the client device image forming apparatuses in the image forming system.

For example, in the image forming system 100, as indicated by arrows (A) in FIG. 9, the new firmware is sent and received through the multipoint session between the host device image forming apparatus 1a and the client device image forming apparatus 1b. That is, in the host device image forming apparatus 1a, the transmission controller 18 executes the multipoint session through the communication section 36 with the client device image forming apparatus 1b and sends the new firmware to the client device image forming apparatus 1b through the communication section 36 (S14 above). By contrast, in the client device image forming apparatus 1b, the reception section 19 executes the multipoint session through the communication section 36 with the host device image forming apparatus 1a and receives the new firmware from the host device image forming apparatus 1a through the communication section 36 (YES in S20 above).

Next, the controller 11 has the corresponding image forming apparatuses 1b, 1c, 1d, or 1e function as a host device. That is, in one of the image forming apparatuses 1b to 1e, when the controller 11 stores the new firmware and the new version information on the HDD 37, the image forming apparatus 1b, 1c, 1d, or 1e functions as a host device that is a source that supplies the new firmware. That is, in one of the image forming apparatuses 1b to 1e, the process progresses to S12.

Figure 10:
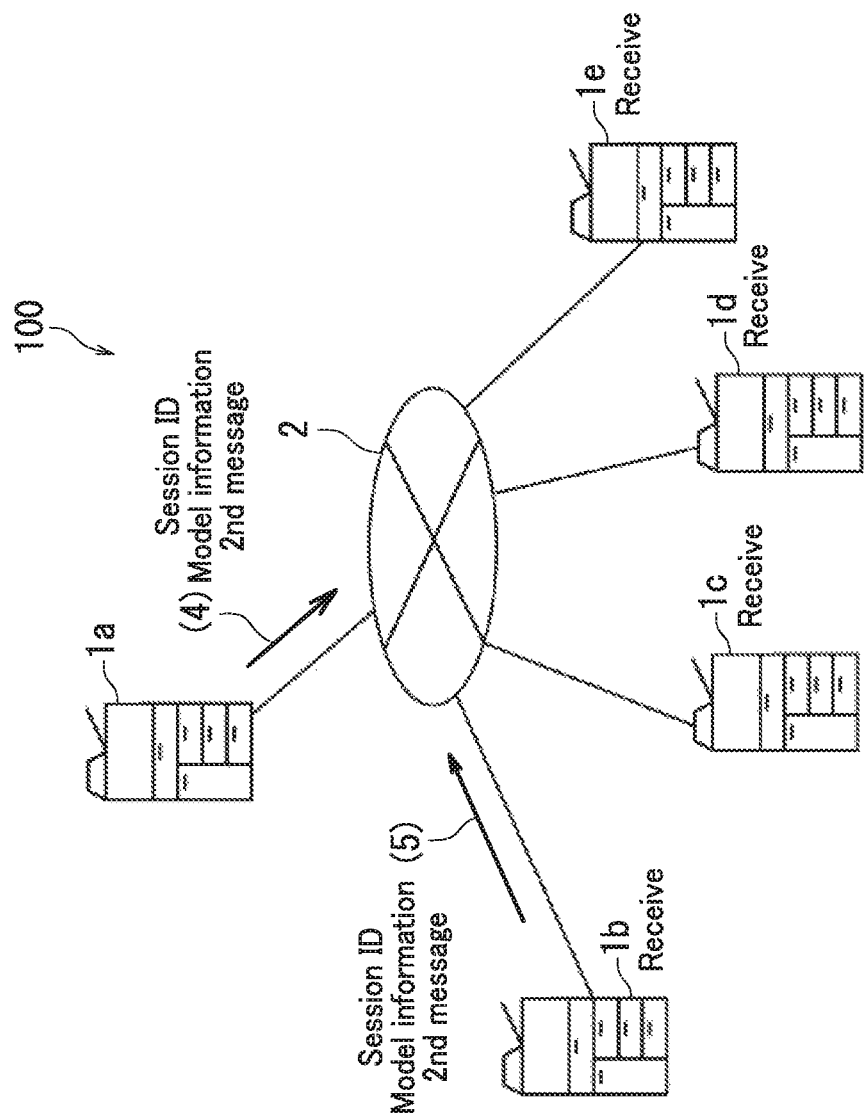
FIG. 10 is a diagram illustrating an example of the operating state of the image forming apparatuses included in the image forming system when the second request section of the host device image forming apparatus has operated.

For example, as indicated by an arrow (4) in FIG. 10, in the host device image forming apparatus 1a, the second request section 16 uses the list to send the session ID, the new version information, and the second message to all of the other image forming apparatuses 1b to 1e included in the group through the communication section 36 (S12). Similarly, as indicated by an arrow (5) in FIG. 10, in the host device image forming apparatus 1b, the second request section 16 uses the list to send the session ID, the new version information, and the second message to all of the other image forming apparatuses 1a and 1c to 1e included in the group through the communication section 36 (S12). As such, in the present embodiment, both of the image forming apparatuses 1a and 1b function as host devices. That is, in the present embodiment, each time S22 finishes, the number of host device image forming apparatuses 1 increases by powers of two.

Figure 11:
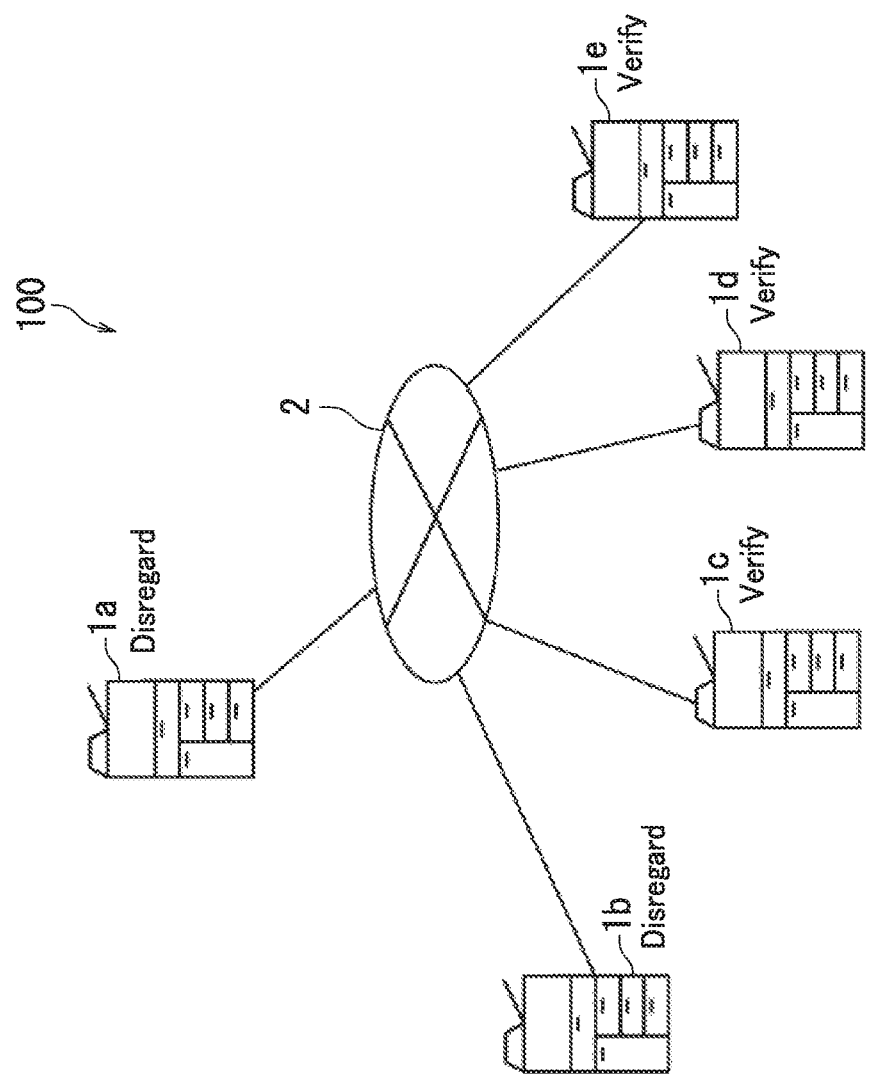
FIG. 11 is a diagram illustrating an example of the operating state of the image forming apparatuses included in the image forming system when a second response section of the image forming apparatus has operated.

Continuing, in the host device image forming apparatus 1a as illustrated in FIG. 11, it is determined that the version information sent from the host device image forming apparatus 1b is the same as the version information stored on the HDD 37. Therefore, a response to the second message from the image forming apparatus 1b is not sent, that is, the second message is disregarded. Similarly, in the host device image forming apparatus 1b, it is determined that the version information sent from the host device image forming apparatus 1a is the same as the version information stored on the HDD 37. Therefore, a response to the second message from the image forming apparatus 1a is not sent, that is, the second message is disregarded.

By contrast, in the client device image forming apparatuses 1c to 1e, the information such as the execution confirmation (second message) of the multipoint session from the host device image forming apparatuses 1a and 1b is verified. Then, when the client device image forming apparatus 1c for example selects either of the host device image forming apparatuses 1a or 1b and requests execution of the multipoint session, the new firmware is sent and received through the multipoint session between the selected host device image forming apparatus 1a or 1b (herein the image forming apparatus 1a) and the client device image forming apparatus 1c as indicated by arrows (B) in FIG. 12. The client device image forming apparatus 1c is updated with the new firmware from the host device image forming apparatus 1a.

Figure 12:
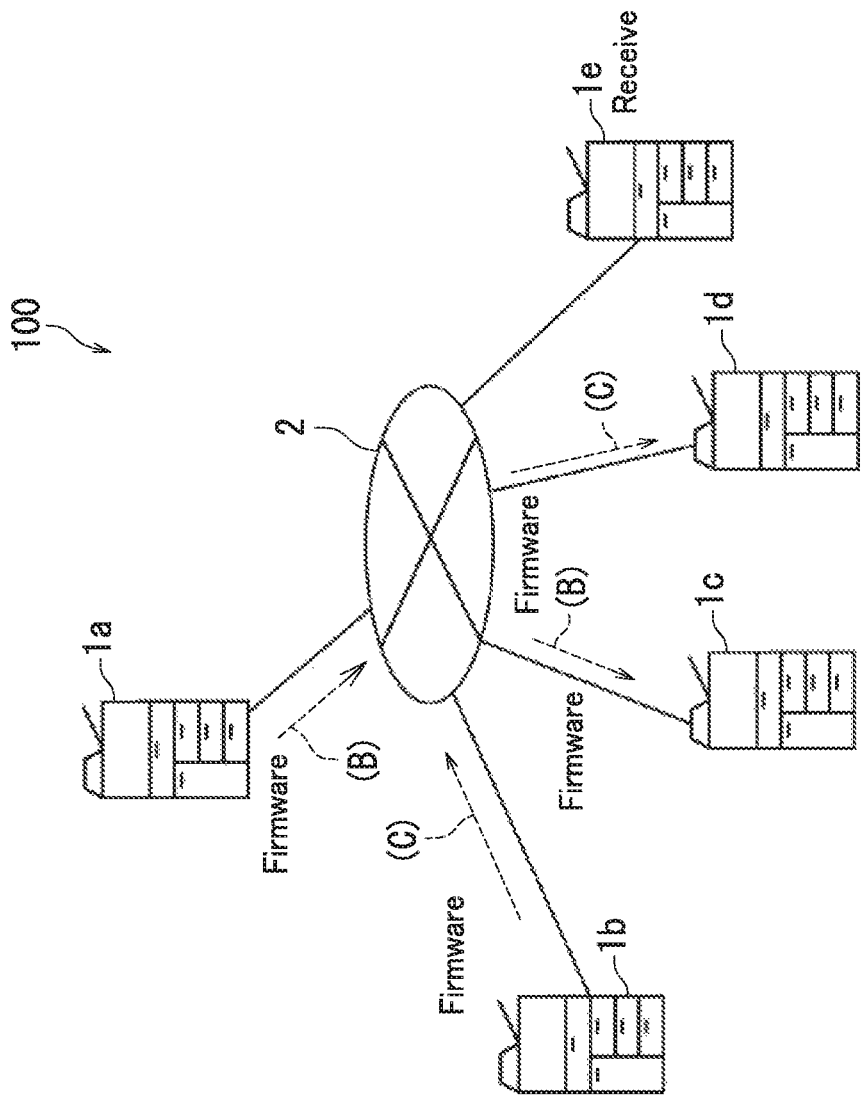
FIG. 12 is a diagram illustrating another example of sending and receiving the new firmware between the host device image forming apparatus and the client device image forming apparatuses in the image forming system.

When the client device image forming apparatus 1d, for example, selects either of the host device image forming apparatuses 1a or 1b and requests execution of the multipoint session, the new firmware is sent and received through the multipoint session between the selected host device image forming apparatus 1a or 1b (herein the image forming apparatus 1b) and the client device image forming apparatus 1d as indicated by arrows (C) in FIG. 12. The client device image forming apparatus 1d is updated with the new firmware from the host device image forming apparatus 1b. As a result, the image forming apparatuses 1c and 1d function hereafter as host devices.

Note that, for example, the client device image forming apparatus 1e also selects either of the host device image forming apparatuses 1a or 1b and requests execution of the multipoint session, but at this time, the new firmware is not sent or received through the multipoint session between the selected host device image forming apparatus 1a or 1b and the image forming apparatus 1e.

Figure 13:
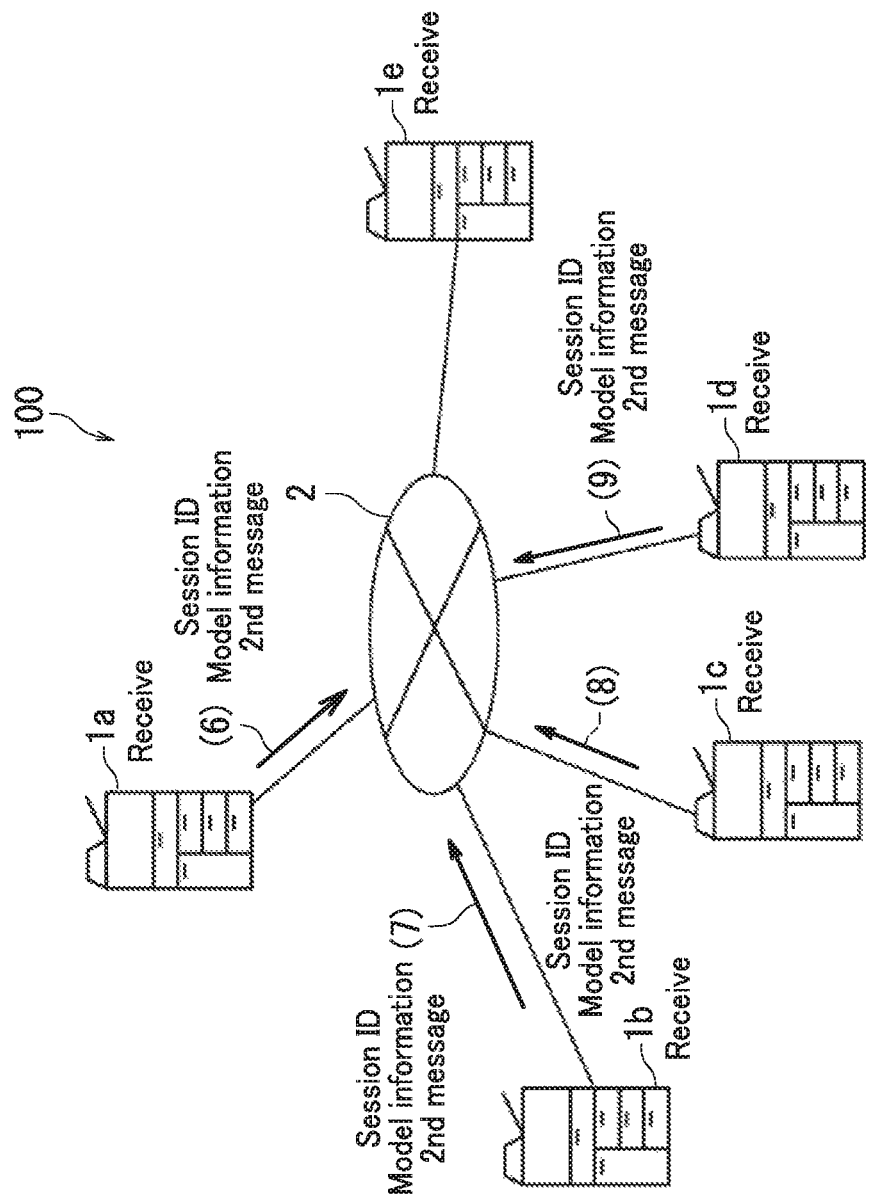
FIG. 13 is a diagram illustrating another example of the operating state of the image forming apparatuses included in the image forming system when the second request section of the host device image forming apparatus has operated.

Continuing, as indicated by an arrow (6) in FIG. 13, the second request section 16 in the host device image forming apparatus 1a uses the list to send the session ID, the new version information, and the second message through the communication section 36 to all of the other image forming apparatuses 1b to 1e included in the group (S12). Similarly, as indicated by an arrow (7) in FIG. 13, the second request section 16 in the host device image forming apparatus 1b uses the list to send the session ID, the new version information, and the second message through the communication section 36 to all of the other image forming apparatuses 1a and 1c to 1e included in the group (S12).

As indicated by an arrow (8) in FIG. 13, the second request section 16 in the host device image forming apparatus 1c uses the list to send the session ID, the new version information, and the second message through the communication section 36 to all of the other image forming apparatuses 1a, 1b, 1d, and 1e included in the group (S12). Similarly, as indicated by an arrow (9) in FIG. 13, the second request section 16 in the host device image forming apparatus 1d uses the list to send the session ID, the new version information, and the second message through the communication section 36 to all of the other image forming apparatuses 1a to 1c and 1e included in the group (S12).

Figure 14:
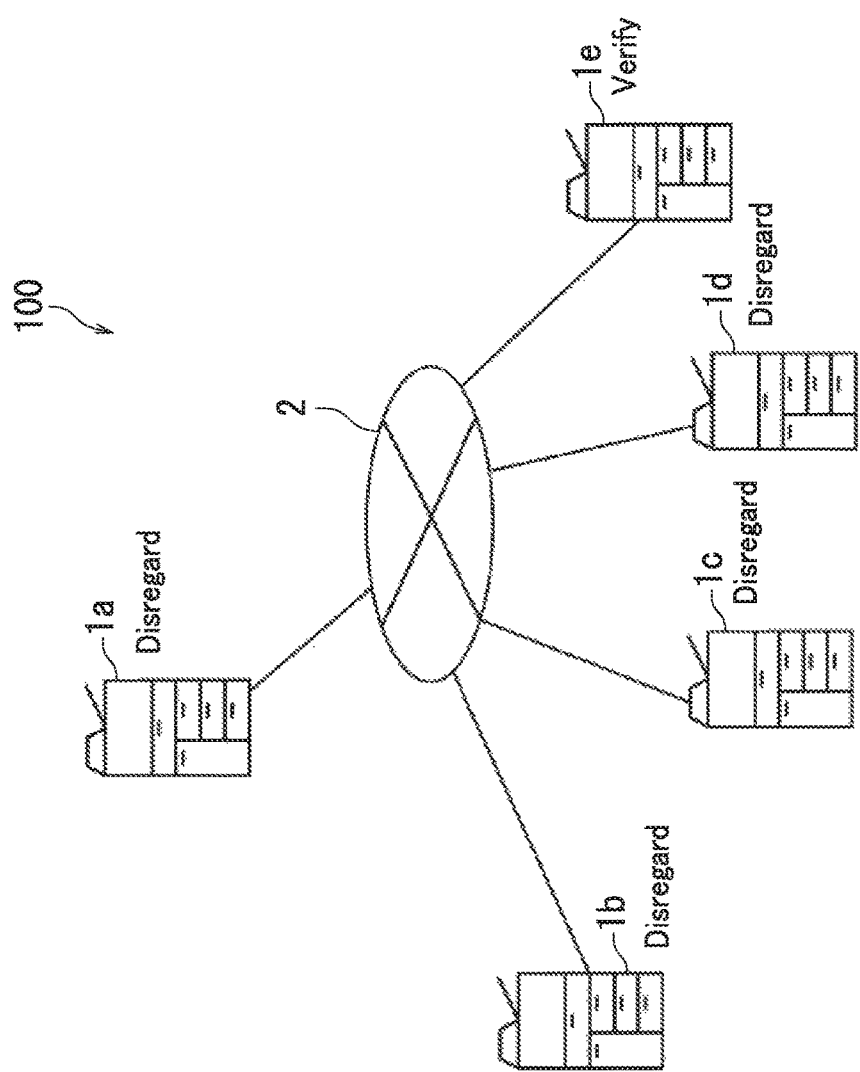
FIG. 14 is a diagram illustrating another example of the operating state of the image forming apparatuses included in the image forming system when the second response section of the image forming apparatus has operated.

Continuing, in the host device image forming apparatus 1a as illustrated in FIG. 14, it is determined that the version information sent from the host device image forming apparatuses 1b to 1d is the same as the version information stored on the HDD 37. Therefore, a response to the second message is not sent from the image forming apparatuses 1b to 1d. That is, the second message is disregarded. Similarly, in the host device image forming apparatus 1b, it is determined that the version information sent from the host device image forming apparatuses 1a, 1c, and 1d is the same as the version information stored on the HDD 37. Therefore, a response to the second message is not sent from the image forming apparatuses 1a, 1c, and 1d. That is, the second message is disregarded. Similarly, in the host device image forming apparatus 1c, it is determined that the version information sent from the host device image forming apparatuses 1a, 1b, and 1d is the same as the version information stored on the HDD 37. Therefore, a response to the second message is not sent from the image forming apparatuses 1a, 1b, and 1d. That is, the second message is disregarded. Similarly, in the host device image forming apparatus 1d, it is determined that the version information sent from the host device image forming apparatuses 1a to 1c is the same as the version information stored on the HDD 37. Therefore, a response to the second message is not sent from the image forming apparatuses 1a, 1b, and 1c. That is, the second message is disregarded.

Figure 15:
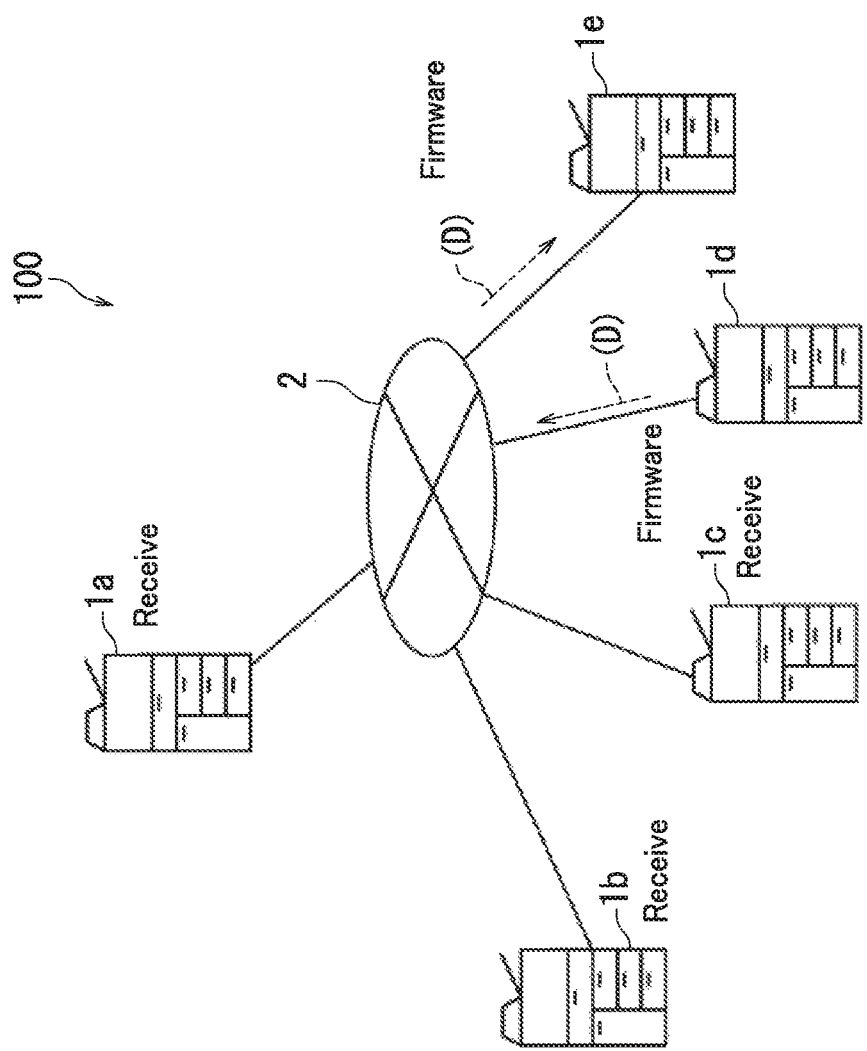
FIG. 15 is a diagram illustrating another example of sending and receiving the new firmware between the host device image forming apparatus and the client device image forming apparatuses in the image forming system.

By contrast, in the client device image forming apparatus 1e, the information such as the execution confirmation (second message) of the multipoint session from the host device image forming apparatuses 1a to 1d is verified. Then, when the client device image forming apparatus 1e for example requests execution of the multipoint session to the host device image forming apparatus 1d, the new firmware is sent and received through the multipoint session between the host device image forming apparatus 1d and the client device image forming apparatus 1e as indicated by arrows (D) in FIG. 15. The client device image forming apparatus 1e is updated with the new firmware from the host device image forming apparatus 1d. As a result, the image forming apparatus 1e functions as a host device hereafter.

Figure 16:
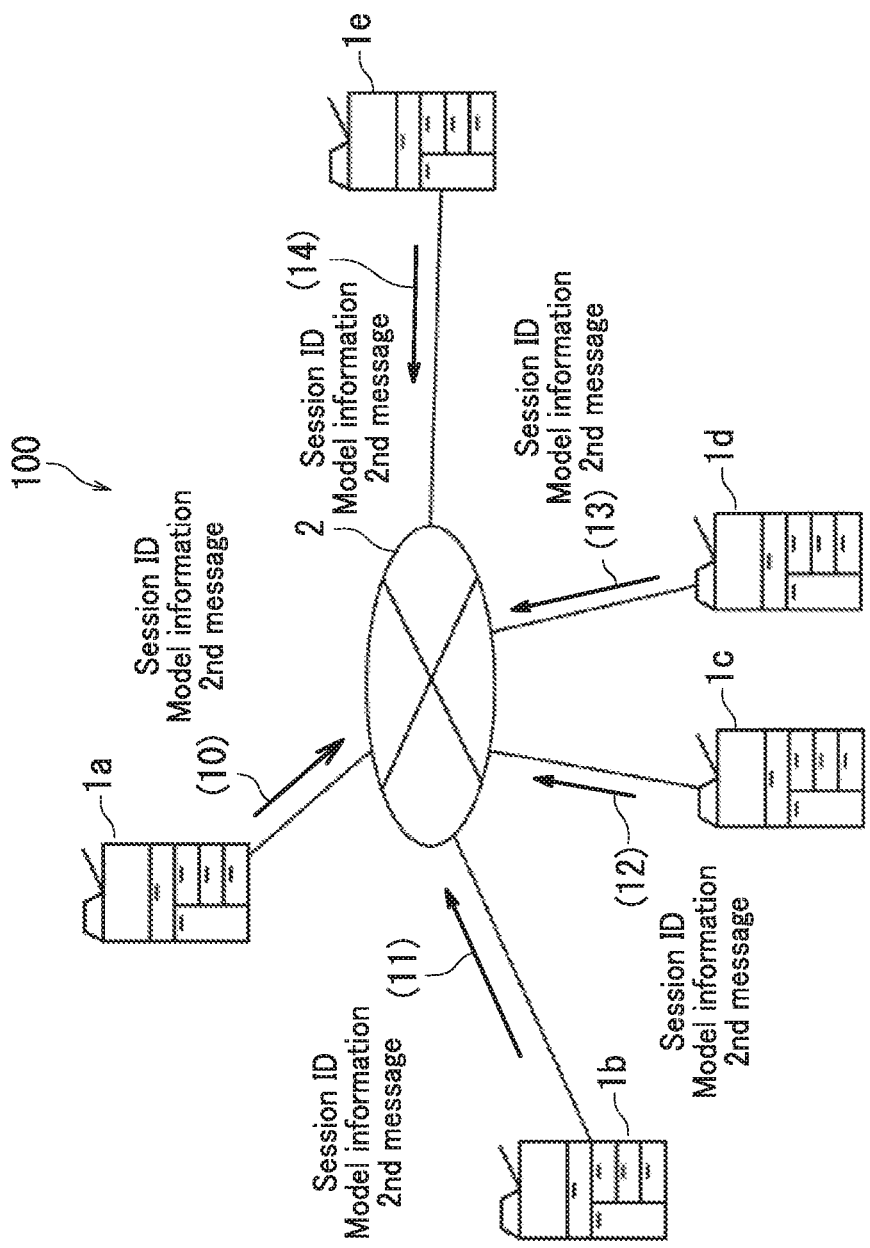
FIG. 16 is a diagram illustrating another example of the operating state of the image forming apparatuses included in the image forming system when the second request section of the host device image forming apparatus has operated.

Continuing, as indicated by an arrow (10) in FIG. 16, the second request section 16 in the host device image forming apparatus 1a uses the list to send the session ID, the new version information, and the second message through the communication section 36 to all of the other image forming apparatuses 1b to 1e included in the group (S12). Similarly, as indicated by an arrow (11) in FIG. 16, the second request section 16 in the host device image forming apparatus 1b uses the list to send the session ID, the new version information, and the second message through the communication section 36 to all of the other image forming apparatuses 1a and 1c to 1e included in the group (S12).

As indicated by an arrow (12) in FIG. 16, the second request section 16 in the host device image forming apparatus 1c uses the list to send the session ID, the new version information, and the second message through the communication section 36 to all of the other image forming apparatuses 1a, 1b, 1d, and 1e included in the group (S12). Similarly, as indicated by an arrow (13) in FIG. 16, the second request section 16 in the host device image forming apparatus 1d uses the list to send the session ID, the new version information, and the second message through the communication section 36 to all of the other image forming apparatuses 1a to 1c and 1e included in the group (S12).

As indicated by an arrow (14) in FIG. 16, the second request section 16 in the host device image forming apparatus 1e uses the list to send the session ID, the new version information, and the second message through the communication section 36 to all of the other image forming apparatuses 1a to 1d included in the group (S12). Then, in the image forming system 100 of the present embodiment, as illustrated in FIG. 16, the second request sections 16 of all of the image forming apparatuses 1a to 1e send information such as the second message (information such as the execution confirmation of the multipoint session). When the communication sections 36 of the image forming apparatuses 1a to 1e receive the information, the controllers 11 in all of the image forming apparatuses 1a to 1e halt operation of the second response sections 17 and finish execution of the multipoint session through the communication sections 36. That is, in the image forming system 100 of the present embodiment, when all of the image forming apparatuses 1a to 1e have become host devices functioning as a supply source of the new firmware, it is determined that the new firmware update job is finished. As such, in the image forming system 100 of the present embodiment, new firmware update failure can be reliably prevented.

As above, in a host device image forming apparatus 1 of the present embodiment, when the session determining section 12 has determined to execute the multipoint session through the communication section 36, the first request section 13 sends the session ID, the model information, and the first message to enquire about whether to participate in the multipoint session to all of the client device image forming apparatuses 1 through the communication section 36. When the communication section 36 has received a response to participate in the multipoint session from the client device image forming apparatuses 1, the group forming section 15 forms a group that participates in the multipoint session, including the host device image forming apparatus 1 and the client device image forming apparatuses 1 that have sent responses to participate in the multipoint session. The second request section 16 sends the session ID, the new version information, and the second message to enquire about whether to execute the multipoint session through the communication section 36 to all of the client device image forming apparatuses 1 included in the group. When the communication section 36 has received the response to execute the multipoint session from one of the client device image forming apparatuses 1 included in the group, the transmission controller 18 executes the multipoint session through the communication section 36 with the image forming apparatus 1 that has sent the response to execute the multipoint session. Thus, the transmission controller 18 sends the new firmware to the image forming apparatus 1 through the communication section 36. Therefore, in the present embodiment, time required for the new firmware updating job in each of the image forming apparatuses 1 can be shortened even when a large number of image forming apparatuses 1 are not connected to the server.

Figure 17:
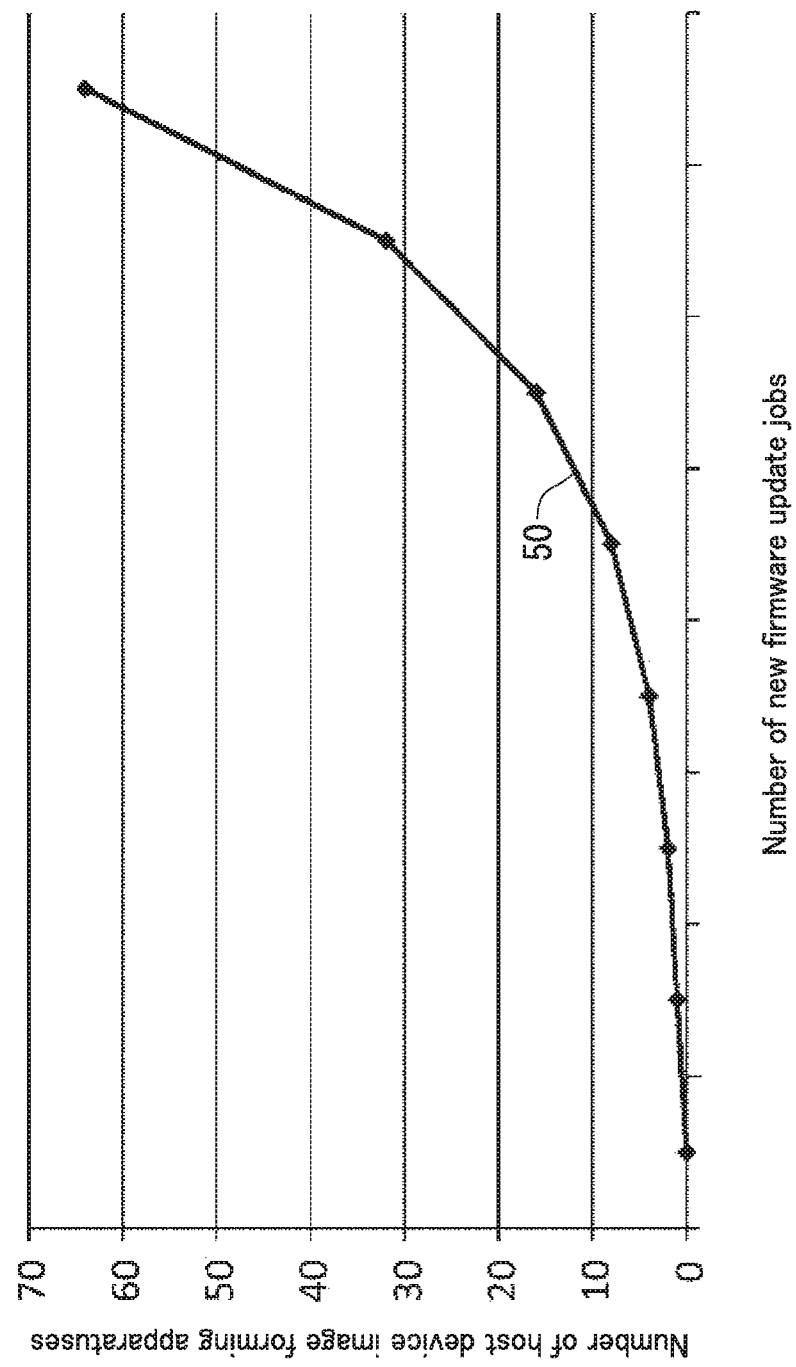
FIG. 17 is a graph illustrating an increase rate of host device image forming apparatuses in the image forming system.

That is, in the host device image forming apparatus 1 of the present embodiment, the group forming section 15 forms a group that participates in the multipoint session, and therefore it is not necessary to communicate with all of the other image forming apparatuses 1 even when there is a plurality of image forming apparatuses 1 that are assigned the same multicast address. Also, the transmission controller 18 only sends the new firmware to the other image forming apparatuses 1 that have sent the responses to execute the multipoint session, of the other image forming apparatuses 1 included in the group. Furthermore, because the number of host device image forming apparatuses 1 increases by powers of two in the group participating in the multipoint session, the new firmware updating job time can be shortened even when there are a large number of client device image forming apparatuses 1 that require an updating job. For example, as indicated by a curve 50 in FIG. 17, the number of image forming apparatuses 1 serving as host devices doubles (for example, refer to FIGS. 10 and 13) each time the new firmware updating job (S21) finishes. As a result, the time required for the new firmware updating job of the image forming apparatuses 1 can be shortened.

In each of the client device image forming apparatuses 1 of the present embodiment, the first response section 14 compares the model information received from the host device image forming apparatus 1 with the model information stored on the HDD 37, and sends a response to the host device image forming apparatus 1 through the communication section 36 to participate in the multipoint session only when it is determined that the received model information matches the model information stored on the HDD 37. The second response section 17 compares the version information received from the host device image forming apparatus 1 with the version information stored on the HDD 37 and sends a response to the host device image forming apparatus 1 through the communication section 36 to execute the multipoint session only when it is determined that the new firmware is newer than the firmware stored on the HDD 37. As such, because the client device image forming apparatuses 1 of the present embodiment use the version information from the host device image forming apparatus 1 to determine whether or not the new firmware updating job is necessary even when participating in the multipoint session, it is not necessary to access the host device image forming apparatus 1 when the new firmware updating job is not necessary. As a result, an unnecessary access job can be omitted, and the time required for the new firmware updating job in the image forming apparatuses 1 can be shortened.

It should be noted that the configuration and process illustrated by the above embodiment using FIGS. 1 to 17 is but one aspect of the present disclosure, and is not meant to limit the configuration or process of the present disclosure.

What is claimed is:

1. An image forming apparatus that is assigned a predetermined multicast address, comprising:
   a storage device configured to store model information indicating a model of the image forming apparatus, firmware for use by the image forming apparatus, version information indicating a version of the firmware, and a firmware updating program;
   a communication device connected to one or more other image forming apparatuses that are assigned the same multicast address through an intranet, and that is configured to communicate with the other image forming apparatuses; and
   a control unit including a processor, wherein
   the processor functions as a session determining section, a first request section, a group forming section, a second request section, and a transmission controller by executing the firmware updating program stored in the storage device,
   the session determining section determines to execute a multipoint session for sending new firmware through the communication device to the other image forming apparatuses using a peer-to-peer system in which the image forming apparatus and the other image forming apparatuses are connected through the intranet when the new firmware and corresponding new version information are stored in the storage device,
   the first request section sends a session ID identifying the multipoint session, the model information, and a first message to enquire about whether to participate in the multipoint session through the communication device to all of the other image forming apparatuses, when the session determining section has determined to execute the multipoint session through the communication device,
   the group forming section forms a group that participates in the multipoint session, including the image forming apparatus and one or more of the other image forming apparatuses that have the same model information as the model information and that have sent a response to participate in the multipoint session, when the communication device has received the response to participate in the multipoint session from the one or more other image forming apparatuses,
   the second request section sends the session ID, the version information, and a second message to enquire about whether to execute the multipoint session through the communication device to all of the other image forming apparatuses included in the group,
   the transmission controller executes the multipoint session through the communication device with one or more of the other image forming apparatuses that have version information differing from the version information and that have sent a response to execute the multipoint session, and sends the new firmware to the other image forming apparatuses having the differing version information through the communication device when the communication device has received the response to execute the multipoint session from at least one of the other image forming apparatuses having the differing version information,
   the one or more other image forming apparatuses that have been sent the new firmware from the image forming apparatus receive the new firmware, and
   the one or more other image forming apparatuses that have received the new firmware store the new firmware and execute an update of the new firmware.

2. The image forming apparatus according to claim 1, wherein
   the communication device receives the session ID, the model information, the first message, the version information, and the second message from one of the other image forming apparatuses,
   the processor further functions as a first response section, a second response section, and a reception section by executing the firmware updating program stored in the storage device,
   the first response section
   compares the received model information with the model information stored in the storage device when the communication device has received the session ID, the model information, and the first message,
   sends a response to participate in the multipoint session through the communication device to the one of the other image forming apparatuses as a response to the first message when it is determined that the received model information matches the model information stored in the storage device, and
   sends a response not to participate in the multipoint session through the communication device to the one of the other image forming apparatuses as a response to the first message when it is determined that the received model information does not match the model information stored in the storage device, the second response section compares the received version information with the version information stored in the storage device when the communication device has received the session ID, the version information, and the second message from the one of the other image forming apparatuses, and sends a response to execute the multipoint session through the communication device to the one of the other image forming apparatuses as a response to the second message when the version information differs, and the reception section executes the multipoint session through the communication device with the one of the other image forming apparatuses and receives the new firmware from the one of the other image forming apparatuses through the communication device when the second response section has sent a response to execute the multipoint session through the communication device to the one of the other image forming apparatuses.

3. The image forming apparatus according to claim 2, wherein the processor further functions as a controller by executing the firmware updating program stored in the storage device, the controller stores the new firmware and the version information in the storage device when the new firmware has been received from the one of the other image forming apparatuses by the reception section, and the second request section sends the version information and the second message through the communication device to all of the other image forming apparatuses included in the group when the controller has stored the new firmware and the version information in the storage device.

4. The image forming apparatus according to claim 3, wherein the second request section finishes sending the session ID, the version information, and the second message through the communication device to all of the other image forming apparatuses included in the group when the communication device has received the second message from all of the other image forming apparatuses included in the group.

5. The image forming apparatus according to claim 3, wherein the communication device receives a list of one or more image forming apparatuses included in the group that are other image forming apparatuses participating in the multipoint session from one of the other image forming apparatuses, and the second request section uses the received list to send the session ID, the version information, and the second message through the communication device to all of the other image forming apparatuses included in the group when the communication device has received the list.

6. A firmware updating method for implementation on an image forming apparatus, and for updating firmware through communication through an intranet between the image forming apparatus that is assigned a predetermined multicast address and one or more other image forming apparatuses that are assigned the same multicast address, the firmware updating method comprising:

determining to execute a multipoint session for sending new firmware through a communication device to the other image forming apparatuses using a peer-to-peer system in which the image forming apparatus and the other image forming apparatuses are connected through the intranet when the new firmware and corresponding new version information are stored in storage device;

primary sending in which a session ID identifying the multipoint session, model information stored in the storage device, and a first message to enquire about whether to participate in the multipoint session are sent through the communication device to all of the other image forming apparatuses;

group forming in which a group is formed that participates in the multipoint session, including the image forming apparatus and one or more of the other image forming apparatuses that have the same model information as the model information and that have sent a response to participate in the multipoint session, when the communication device has received a response to participate in the multipoint session from the one or more other image forming apparatuses;

secondary sending in which the session ID, the version information, and a second message to enquire about whether to execute the multipoint session are sent through the communication device to all of the other image forming apparatuses included in the group;

tertiary sending in which the multipoint session is executed through the communication device with one or more of the other image forming apparatuses that have version information differing from the version information and that have sent a response to execute the multipoint session, and the new firmware is sent to the other image forming apparatuses having the differing version information through the communication device, when the communication device has received the response to execute the multipoint session from the other image forming apparatuses having the differing version information;

causing one or more of the other image forming apparatuses to receive the new firmware through the intranet; and storing the new firmware in the one or more other image forming apparatuses that have received the new firmware, and executing an update of the new firmware.

* * * * *